United States Patent [19]

Suwa et al.

[11] Patent Number: 4,853,804
[45] Date of Patent: Aug. 1, 1989

[54] MAGNETIC RECORDING AND/OR REPRODUCING APPARATUS

[75] Inventors: Hisashi Suwa; Seiji Sato; Susumu Matsubara, all of Kanagawa; Eiji Yano, Tokyo; Katsuyuki Koizumi, Kanagawa, all of Japan

[73] Assignee: Sony Corporation, Tokyo, Japan

[21] Appl. No.: 169,439

[22] Filed: Mar. 17, 1988

[30] Foreign Application Priority Data

Mar. 26, 1987 [JP] Japan .................... 62-72590

[51] Int. Cl.$^4$ .............................................. G11B 5/027
[52] U.S. Cl. ................................... 360/85; 360/96.5
[58] Field of Search .................... 360/84, 85, 94, 96.3, 360/96.5, 96.6; 242/197-200

[56] References Cited

U.S. PATENT DOCUMENTS 4,639,797 1/1987 Kobayashi .................. 360/85 X
4,706,141 11/1987 Oba et al. .

Primary Examiner—A. J. Heinz
Attorney, Agent, or Firm—Lewis H. Eslinger; Jay H. Maioli

[57] ABSTRACT

A magnetic recording and/or reproducing apparatus which includes a rotary magnetic head device, a reel block base plate provided on a chassis plate and having a pair of reel blocks horizontally reciprocable relative to the rotary magnetic head device and operatively engaged with a pair of tape reels of a tape cassette, a cassette holder which is supported by a supporting arm on the chassis base plate so as to be vertically movable relative to the reel block and in which the tape cassette is inserted and retained, an operating mode changeover lever for selecting the various operating modes, including constant speed running, rapid feed and rewind modes, for the magnetic tape pulled out of the tape cassette and loaded into the predetermined tape path, and a drive gear driven into rotation by a driving electric motor, wherein the drive gear is operatively associated with the supporting arm and the reel block base plate. The drive gear is driven into rotation to cause vertical movement of the cassette holder and the reciprocating movement of the reel block base plate. An operating lever adapted for being turned by the drive gear is operatively associated with the operating mode changeover lever, and turned to shift the operating mode changeover lever to select one of the predetermined operating modes. In this manner, the operations of loading the tape cassette and the magnetic tape and of selecting the operating mode may be performed by one and the same driving motor to reduce the number of the driving motors and the size and the thickness of the apparatus, while the cassette attachment and detachment and magnetic tape loading and unloading operations can be performed expeditiously.

14 Claims, 13 Drawing Sheets

MAGNETIC RECORDING AND/OR REPRODUCING APPARATUS

BACKGROUND OF THE INVENTION

2. Field of the Invention

This invention relates to a magnetic recording and/or reproducing apparatus, such as a video tape recorder. More particularly, it relates to a magnetic recording and/or reproducing apparatus wherein the operations of vertically shifting the cassette holder supporting the tape cassette, shifting the reel block base plate provided with a reel block carrying the tape cassette relative to the rotary magnetic head device and of selecting the operating modes following the magnetic tape loading operation, may be performed by one and the same driving motor.

2. Description of the Prior Art

It is known from the Japanese Laid-open Patent Publications Nos. 75456/1984 and 182544/1985 that the operations of mounting or attaching the tape cassette to a predetermined loading position and pulling out and loading the magnetic tape contained in the tape cassette to a predetermined tape route are performed by one and the same drive motor to simplify the loading system for the tape cassette and the magnetic tape, while reducing the overall size of the magnetic recording and reproducing apparatus, such as the video recorder.

However, with the apparatus shown in the above Patent Publications, only the operations of securing the tape cassette and loading the magnetic tape may be performed by one and the same electric motor.

There is commercially available a video tape recorder in which a magnetic tape having a tape width of 8 mm is used as the recording medium. With this type the video tape recorder, the magnetic tape as the recording medium has a reduced width, while the tape cassette accommodating the magnetic tape is extremely small in size, so that a further reduction in size of the recording and/or reproducing apparatus itself is required.

For satisfying the demand for reduction in size of the apparatus, there is proposed a video tape recorder in which the reel block base plate including the reel blocks carrying the tape cassette may be reciprocated relative to the rotary magnetic head device. In such a video tape recorder, the reel block base plate is displaced away from the rotary magnetic head device during attachment and detachment of the tape cassette. On the other hand, during magnetic tape loading, the reel block base plate is drawn near to the rotary magnetic head device to permit a reliable and facilitated tape cassette attachment operation, while the magnetic tape loading area is reduced to simplify and reduce the size of the loading system while simultaneously reducing the size of the apparatus.

When the loading system as shown in the above Laid-open Patent Publication is applied to the above described video tape recorder, means need be provided for shifting the reel block base plate. It is also necessary to provide changeover operating means for selecting one of the constant speed running, rapid feed and rewind modes for the magnetic tape, following magnetic tape loading, and separate drive means for switching the changeover operating means. Hence, it is not possible to reduce the size of the video tape recorder sufficiently in keeping with an extremely small size tape cassette used as the recording medium.

OBJECT AND SUMMARY OF THE INVENTION

Accordingly, it is a principal object of the present invention to provide a magnetic recording and/or reproducing apparatus provided with a rotary magnetic head device, such as a video tape recorder.

It is another object of the present invention to provide a magnetic recording and/or reproducing apparatus in which the operations of mounting the tape cassette, loading the magnetic tape and selecting the operating mode following tape loading, may be performed by one and the same electric motor.

It is a further object of the present invention to provide a magnetic recording and/or reproducing apparatus in which the loading operating system and the switching and selecting system for the tape running operating modes are operatively associated with each other to simplify the respective systems.

It is a further object of the present invention to provide a magnetic recording and/or reproducing apparatus in which the operations of mounting the tape cassette, loading the magnetic tape by pulling the magnetic tape out of the tape cassette and winding it in the rotary magnetic device, unloading the magnetic tape by retracting the magnetic tape into the tape cassette and taking out the cassette may be performed expeditiously.

It is yet another object of the present invention to provide a magnetic recording and/or reproducing apparatus in which the small-sized tape cassette having enclosed therein a magnetic tape with the tape width of 8 mm is used as the recording medium and in which the apparatus itself may be reduced in size and thickness.

In accordance with the present invention, there is provided a magnetic recording and/or reproducing apparatus comprising a rotary magnetic head device, a reel block base plate provided on a chassis base plate and including a pair of reel blocks horizontally reciprocable relative to the rotary magnetic head device and operatively engaged with a pair of tape reels of the tape cassette, a cassette holder supported by a supporting arm on the chassis base plate vertically movably relative to the reel block and in which the tape cassette is inserted and retained, an operating mode changeover lever for selecting the various operating modes including constant speed running, rapid feed and rewind modes, for the magnetic tape pulled out of the tape cassette and loaded into the predetermined tape path, and a drive gear driven into rotation by a driving electric motor, said drive gear being operatively associated with said supporting arm and said reel block base plate, said drive gear being driven into rotation to cause vertical movement of the cassette holder and the reciprocating movement of the reel block base plate, an operating lever adapted for being turned by said drive gear and operatively associated with said operating mode changeover lever, said operating lever being turned to shift said operating mode changeover lever to select one of the predetermined operating modes. As the drive gear is driven into rotation by the driving electric motor, the cassette holder supported by the cassette holder is attached to the reel block on the reel block base plate. After such tape cassette attachment operation, the reel block base plate is moved towards the rotary head device and, with such movement of the reel block base plate, the magnetic tape in the tape cassette is pulled out and loaded onto the predetermined tape path. After such loading of the magnetic tape, the drive gear is actuated into rotation to actuate the mode changeover lever to select one of the predetermined operating modes.

These and other objects, features and advantages of the present invention will become apparent from the following detailed description of the preferred embodiments that are to be read in conjunction with the accompanying drawings, throughout which the same reference numerals identify the same or like elements or parts.

DESCRIPTION OF THE PREFERRED EMBODIMENT

The present invention will be hereafter explained by referring to an embodiment in which the invention is applied to a video tape recorder employing a small-sized tape cassette having enclosed therein a magnetic tape with a tape width of 8 mm, that is, a so-called 8 mm video tape recorder.

Figure 1:
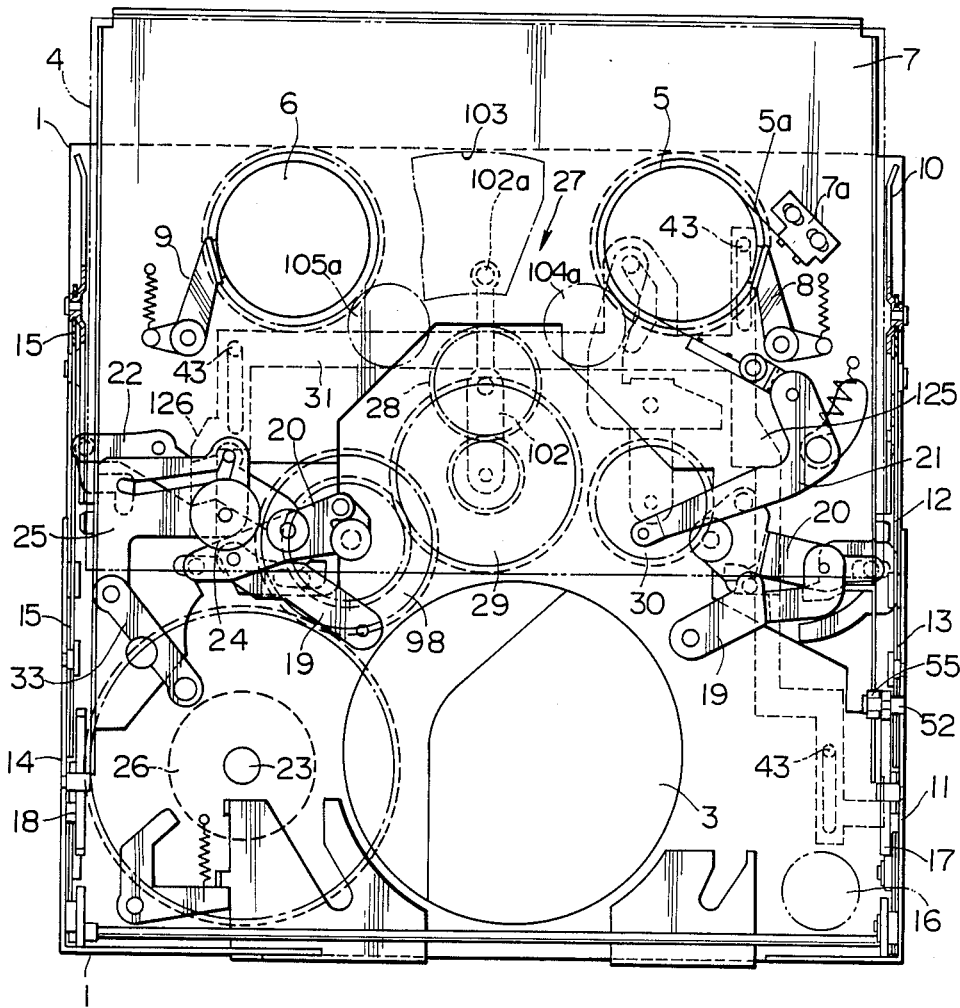
FIG. 1 is a schematic plan view showing the video tape recorder according to the present invention and especially showing the tape unloading state thereof.
Figure 2:
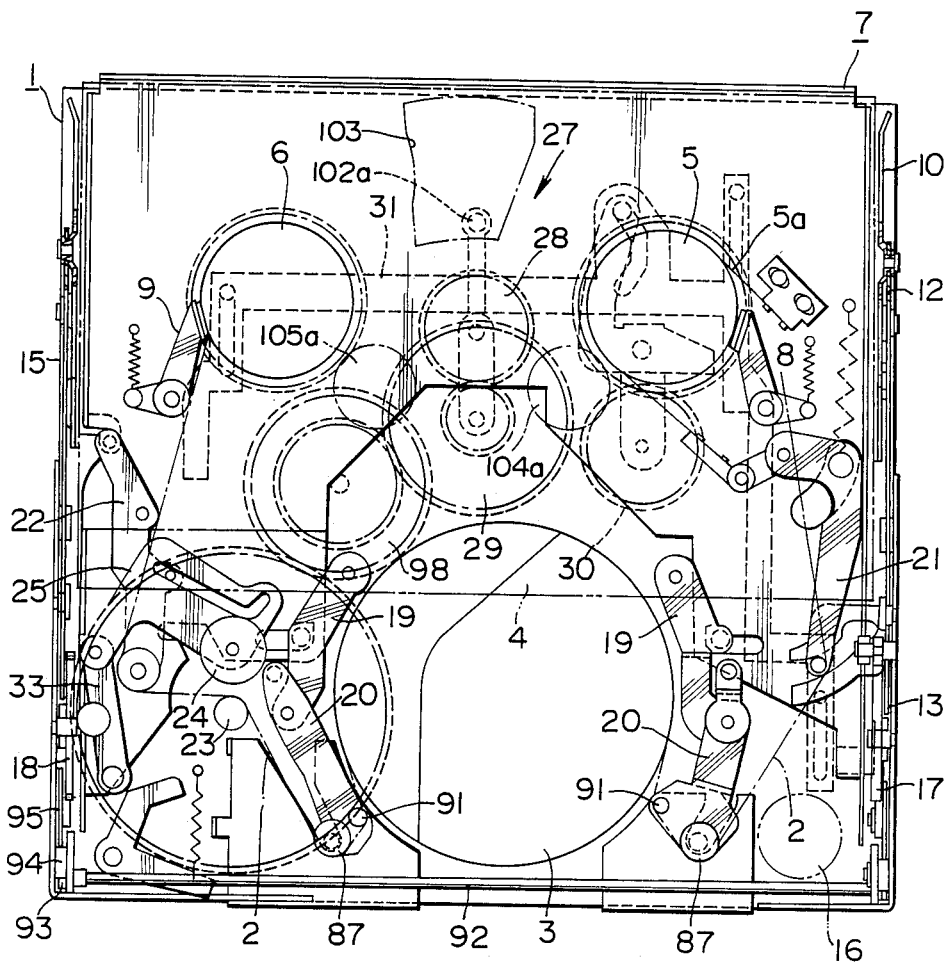
FIG. 2 is a schematic plan view showing the video tape recorder shown in FIG. 1 and especially showing the tape loading state thereof.
Figure 3:
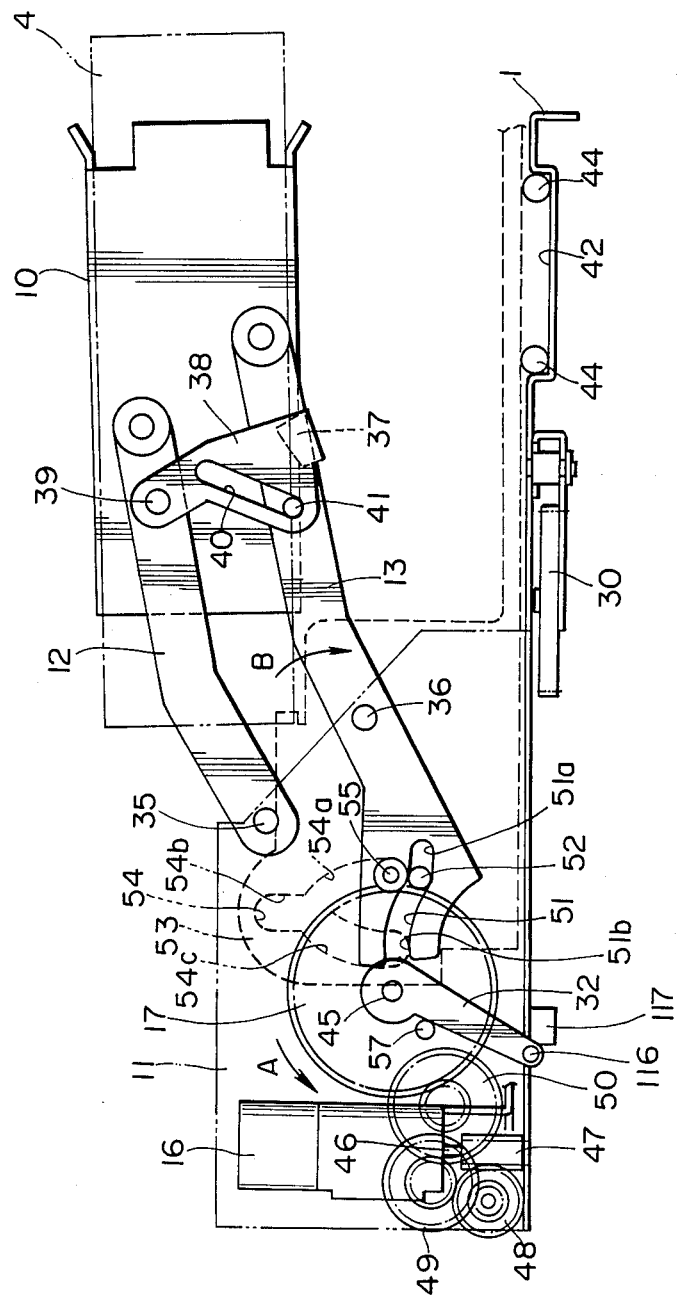
FIG. 3 is a side elevational view showing the tape cassette shifting system of the video tape recorder shown in FIG. 1.

Referring first to FIGS. 1 to 3, the overall construction of the video recorder to which the present invention is applied will be explained.

As shown in FIGS. 1 and 2, a rotary magnetic head device 3 including a tape guide drum about which a magnetic tape 2 is wound and a rotary magnetic head attached thereto, is provided at the center on one side of a chassis base plate 1. On this chassis base plate, there is mounted a reel block base plate 7 for reciprocating movement horizontally relative to the rotary magnetic head device 3. The reel block base plate 7 has attached thereto a supply reel block 5 and a take-up reel block 6 to which a supply tape reel and a take-up tape reel for the tape cassette 4 are attached, respectively. The reel block base plate 7 is also provided with a supply side brake lever 8 adapted to lock the supply reel block 5 to control its rotation at the time of reciprocation of the reel block base plate 7 and a take-up side brake lever 9 adapted to lock the take-up reel block 6 to control its rotation before and after the above described movement of the base plate 7 and also adapted to clear the take-up reel block 6 during such movement of the base plate 7 to permit rotation of the reel block 6.

A cassette holder 10 into which the tape cassette 4 is inserted and retained is provided on the reel block base plate 7. As shown in FIG. 3, the cassette holder 10 has its one lateral side supported by a supporting arm 12 and a rotation operating arm 13 that are pivotally mounted at one end to an upright wall 11 formed on one side of the chassis base plate 1. The cassette holder 10 has its other side supported by a pair of supporting arms 15, 15 pivotally mounted at one end to a second upright wall 14 formed on the other side of the chassis base plate 1, these arms 12, 13, 15, 15 being turned to cause vertical movement of the cassette holder 10 with respect to the reel block base plate 7.

On the side of the chassis base plate 1 provided with the rotary magnetic head device 3, there is provided a drive gear 17 adapted to be driven into rotation by a driving motor 16 to turn the arm 13 to cause vertical movement of the cassette holder 10 relative to the reel block base plate 7 while reciprocating the reel block base plate 7 relative to the rotary magnetic head device 3. On the other side of the chassis base plate 1 confronting to the drive gear 17, there is provided a mode changeover auxiliary gear 18 driven into rotation in synchronism with the drive gear 17.

A pair of chevron-shaped arms 19, 19 and a pair of tape loading arms 20, 20 are provided on both sides of the rotary magnetic head device 3, these arms constituting a loading mechanism or system for extracting the magnetic tape 2 from the tape cassette 4 mounted to the reel blocks 5, 6 and loading the tape onto a predetermined tape passage or route in association with the movement of the reel block base plate 7. On the side of the supply side reel block 5 of the reel block base plate 7, there is provided a tension regulating or control arm 21 that is turned in association with the movement of the reel block base plate 7 to extract the magnetic tape 2 in cooperation with the chevron-shaped arms 19, 19 and the tape loading arms 20, 20. On the side of the take-up reel block 6, there is provided a tape guide arm 22 that is turned in association with the movement of the reel block base plate 7 to extract the magnetic tape 2 in cooperation with the arms 19, 19, 20, 20. Towards the tape guide arm 22, there is provided a pinch roll supporting arm 25 carrying an end pinch roller 24 pressured onto a capstan 23 implanted laterally of the rotary magnetic head device 3 and constituting a constant speed feed system for the magnetic tape 2 together with the capstan 23. This pinch roll supporting arm 25 is also actuated into rotation in association with the movement of the reel block base plate 7.

Between the reel blocks 5 and 6, there is provided a reel block driving unit 27 driven into rotation by a drive power developed by a capstan motor 26 adapted to drive the capstan 23 into rotation to cause selective actuation into rotation of the reel blocks 5, 6. This reel block drive unit 27 is of the traverse type in which it performs a traverse motion as a function of the rotating direction of the capstan motor 26, in such a manner that an end reel block drive gear 28 meshes with reel block gears of the supply reel block 5 or of the take-up reel block 6 to cause rotation of the reel block 5 or 6. It is noted that a drive power transmitting gear 29 adapted to receive the drive power from the capstan motor 26 of the reel block drive unit 27 is designed as a double gear employing permanent magnets according to which the state of rotation thereof is changed as the gear 29 comes into or out of contact with a mode changeover gear 30 provided to the lateral side of the gear 29 to cause rotation of the reel block drive gear 28.

The chassis base plate 1 is also provided with an operating mode changeover lever 31 adapted to shift the mode changeover gear 30 into or out of contact with the drive power transmitting gear 29 of the reel block drive unit or system 27 to effect a changeover between the different operating modes. The operating mode changeover lever 31 is moved by an operating lever 32 driven by the drive gear 17 to select one of the predetermined operating modes.

In the video tape recorder having the above construction, the drive motor 16 is driven when the tape cassette 4 is attached to the cassette holder 10, for driving the gear 17 into rotation. The operating arm 13 is turned with rotation of the drive gear 17 so that the cassette holder 10 is lowered onto the reel blocks 5, 6 for mounting or attaching the tape cassette 4 to these reel blocks. As the drive gear 17 is further rotated after the mounting of the tape cassette 4, the reel block base plate 7 is advanced towards the rotary magnetic head device 3. As the reel block base plate 7 is advanced in this manner, the tension control arm 21 and the tape guide arm 22 are turned significantly, as shown in FIG. 2, while the arms 19, 19, 20, 20 are also turned, so that the magnetic tape 2 within the tape cassette 4 is drawn out onto the predetermined tape passage or route so as to be then wound within the rotary magnetic head device 3.

During the loading operation of the magnetic tape 2, that is, during the movement of the reel block base plate 7, the pinch roll supporting arm 25 is also turned as shown in FIG. 2 to a position in which the pinch roll 24 is drawn near to the capstan 23.

After the termination of the tape loading operation onto the predetermined tape passage or route, the drive motor 16 is driven to drive the gear 17 into rotation to operate the operating mode changeover lever 31 to shift the mode changeover gear 30 into or out of contact with of the reel block drive unit 27 for selecting the respective operating modes. At this time, the mode changeover auxiliary gear 18 is also rotated in timing with that of the drive gear 17, so that the pinch roller supporting arm control arm 33 is also turned by the mode changeover auxiliary gear 18 to turn the pinch roller supporting arm 25 in dependence upon the operating mode as selected by the operating mode changeover lever 31, for shifting the pinch roll 24 into or out of contact with the capstan 23.

After the operation of shifting the operating mode changeover lever 31 for selecting the respective operating modes, the capstan motor 26 is driven into rotation to control the running of tape in accordance with the selected operating mode.

The construction and the operation of the above described video tape recorder will be hereafter explained in more detail.

Figure 4:
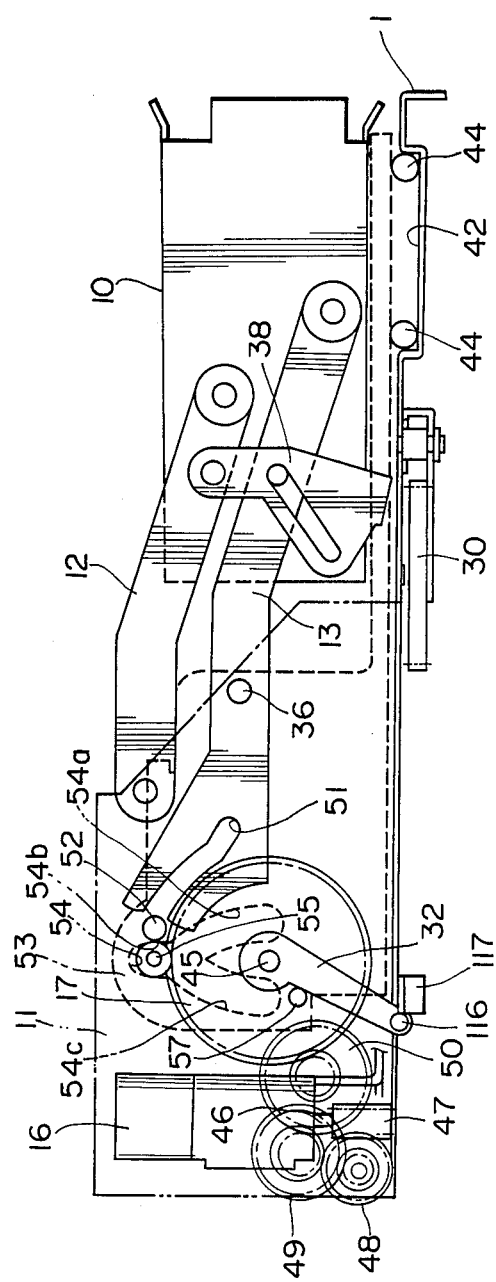
FIG. 4 is a side elevational view showing essential parts of the apparatus shown in FIG. 1 and especially showing the cassette holder in the lowered state.

The cassette holder 10 into which the tape cassette 4 is introduced and retained has its both lateral sides supported by the supporting arm 12, the rotation operating arm 13 and the set of supporting arms 15, 15. The cassette holder 10 having its both lateral sides supported in this manner by the set of supporting arm 12 and the rotation operating arm 13 and the set of supporting arms 15, 15 is adapted to be movable vertically and parallel to the reel block base plate 7 provided on the chassis base plate 1 with the pivot points 35, 36 of the arms 12 to 15 to the upright walls 11, 14 of the chassis base plate 1 as the center. A supporting shaft 39 is provided halfway of the supporting arm 12 provided to one side of the cassette holder 10. An unlocking member 38 having an unlocking portion 37 projectingly provided to one side at the extreme end thereof is supported by a supporting shaft 39, as shown in FIG. 3. The unlocking member 38 is adapted to be turned by the vertical movement of the cassette holder 10 to unlock the front cover of the cassette 4 with respect to the cassette case. A guide pin 41 projectingly provided halfway to the rotation operating arm 13 is engaged in a rotation guide slot 40 formed halfway in the unlocking member 38. When the cassette holder 10 into which the tape cassette is introduced or from which the tape cassette is removed is at an elevated position, the unlocking member 38 is turned so that the unlocking portion 37 is projected towards the bottom side of the cassette holder 10. When the cassette holder 10 is lowered towards the reel block base plate 7 as shown in FIG. 4, the unlocking member 38 is turned so as to clear the bottom side of the cassette holder 10. Therefore, when the tape cassette 4 is introduced into the cassette holder 10 while the cassette holder 10 is at an elevated position, the locking portion of the tape cassette 4 is thrusted by the unlocking portion 37 to be thereby turned to unlock the front cover.

The reel block base plate 7 provided with the reel blocks 5, 6 to which is attached the tape cassette 4 is adapted to be reciprocated relative to the rotary magnetic head device 3 while being guided by a plurality of slide guide pins 43 implanted on the chassis base plate 1 that are engaged in slide guide apertures 42 each having a long axis extending along the transfer direction as shown in FIG. 1. A plurality of slide balls 44 are provided between the chassis base plate 1 and the reel block base plate 7, as shown in FIG. 3, for assuring smooth transfer of the reel block base plate 7.

The driving gear 17 adapted for vertically moving the cassette holder 10 accommodating the tape cassette 4 with respect to the reel blocks 5, 6 to cause reciprocation of the reel block base plate 7 relative to the rotational magnetic head device 3 is pivotally mounted to a supporting shaft 45 implanted on the upright wall 11 on one side of the chassis base plate 1, as shown in FIG. 3, and is adapted to be driven into rotation by the driving motor 16 mounted on the chassis base plate 1, as described above. The driving motor 16 and the driving gear 17 are connected to each other by a first intermediate gear 48, a second intermediate gear 49 and a third intermediate gear 50 constituting a speed reduction gearing that meshes with a worm gear 47 attached to an output shaft 46 of the driving motor 16. On the outer periphery of the drive gear 17 there are provided an operating pin 52 for shifting the cassette holder 10 and an operating pin 55 for shifting the reel block base plate in a side-by-side relation on the outer periphery of the drive gear 17. The pin 52 is engaged in a guide slot 51 formed at the end of the supporting arm 13 extended to overlie the driving gear 17, while the pin 55 is engaged in a substantially γ-shaped slide guide slot 54 in a slide guide wall 53 formed upright on one side of the reel block base plate 7. These pins 52, 55 are mounted by a mounting member 56 projectingly provided to the outer periphery of the drive gear 17 for projecting in a direction orthogonal to the rotational direction of the drive gear 17. On the major surface of the drive gear 17, there is projectingly provided an operating pin 57 for causing rotation of the operating lever 32 which is rotatably supported on the supporting shaft 45 carrying the drive gear 17 and which is provided for extending on the major surface of the drive gear 17.

The guide slot 51 at the foremost part of the operating arm 13 in which is engaged the pin 52 provided to the drive gear 17 is formed with an engaging slot portion 51a in which the pin 52 is engaged from the arms 12, 13, 15, 15 are turned about the pivot points 35, 36 on the upright wall sections 11, 14 of the chassis base plate 1 so that the cassette holder 10 is at the elevated position shown in FIG. 3 until the time the cassette holder 10 is turned towards the reel block base plate 7 so that it is at the lower position, and a guide slot portion 51b continuous with the slot portion 51a and concentric with the rotational trajectory of the operating pin 52.

The guide slot 54 in which is engaged the operating pin 55 provided to the drive gear 17 is formed by a first guide slot portion 54a concentric with the rotational trajectory of the operating pin 55 throughout the angular extent in which, when the reel block base plate 7 is at the pulled-out position in which it is spaced apart from the magnetic head device 3 as shown in FIG. 2, the drive gear 17 is driven into rotation and the operating pin 52 is engaged in the guide slot portion 51a of the guide slot 51 to turn the operating arm 13 to cause vertical movement of the cassette holder 10, an engaging slot portion 54b in which the operating pin 55 is engaged since the time the reel block base plate 7 is at the pulled out position until the time it is shifted to the receded position proximate to the magnetic head device 3, and a second guide slot portion 54c which permits only the drive gear 17 to be turned a predetermined angle after the reel block base plate 7 has reached the aforementioned recorded position and which is concentric with the rotational trajectory of the operating pin 55.

When the cassette holder 10 is at the elevated position and the reel block base plate 7 is at the pulled-out position, the drive gear 17 has been turned to a rotary position shown in FIG. 1 wherein the operating pin 52 is engaged with the innermost portion of the engaging slot portion 51a of the guide slot 51 and the operating pin 55 is engaged with the end of the first guide slot portion 54a of the slide guide slot 54.

When the driving motor 16 is driven into rotation, with the drive gear 17 remaining in the rotational position shown in FIG. 3, and the drive gear 17 is turned in the direction of the arrow mark A in FIG. 3, the operating pin 52 is engaged in the engaging slot portion 51a of the guide slot 51, so that the operating arm 13 of the cassette holder 10 is turned clockwise or in the direction of an arrow B in FIG. 3 with the pivot point 36 as center. With the rotation of the operating arm 13, the supporting arm 12 is also turned in the same direction with the pivot point 35 as center so that the cassette holder 10 is lowered onto the reel block base plate 7 as shown in FIG. 4 and the tape cassette 4 mounted within the cassette holder 10 is attached to the reel blocks 5, 6 provided within the reel block base plate 7.

It is noted that, with the cassette holder 10 in the elevated position and with the tape cassette 4 mounted in position, the front cover of the tape cassette 4 has been unlocked by the unlocking portion 37, as described hereinabove. When the cassette holder 10 is lowered towards the reel block base plate 7, the front cover of the tape cassette 4 is turned by an operating member adapted for turning the front cover, not shown, so that the front side of the tape cassette 4 is opened to permit the magnetic tape 2 to face outward.

During the operation of turning the operating arm 13 by the operating pin 52 of the drive gear 17, the operating pin 55 is positioned within the first guide slot portion 54a of the slide guide slot 54 with the reel block base plate 7 being inoperative at the pulled-out position.

Figure 5:
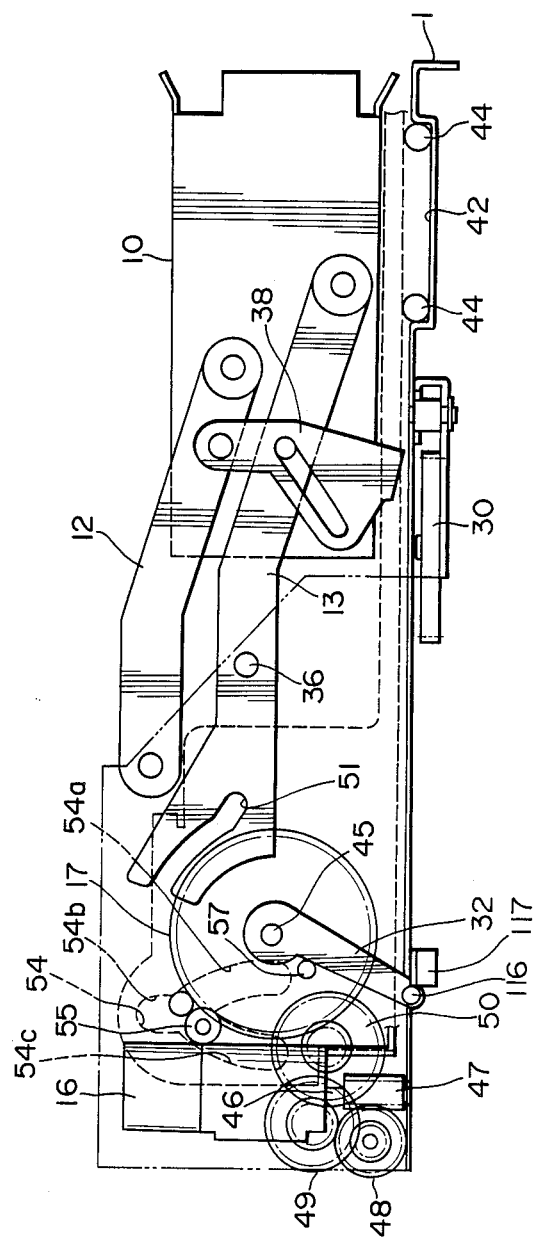
FIG. 5 is a side elevational view showing the essential parts of the apparatus shown in FIG. 1 and especially showing the reel block base plate in the recording state.

When the operating arm 13 is turned in this manner so that the cassette holder 10 draws near to the reel block base plate 7 and the tape cassette 4 is moved to the lower position in which it is attached to the reel blocks 5, 6 the operating pin 52 reaches a position in which it exits the engaging slot portion 51a of the guide slot 51, the operating pin 52 then intruding into the guide slot portion 51b to complete the operation of turning of the operating arm 13. Upon completion of the turning of the operating arm 13, the operating pin 52 is moved out of the guide slot portion 51b of the guide slot 51 and into the inside of the first guide slot portion 54a of the side guide slot 54. Before the operating pin 52 is disengaged out of the guide slot portion 51b of the guide slot 51, the operating pin 55 exits the first guide slot portion 54a of the slide guide slot 54 so as to be engaged in the engaging slot portion 54b to cause forward movement of the reel block base plate 7 towards the rotary magnetic head device 3, as shown in FIGS. 5 and 3, whilst the drive gear 17 is turned in the direction of the arrow A in FIG. 3. As the drive gear 17 is rotated further until the loading and position for the magnetic tape 2 in which the reel block base plate 7 is proximate to the rotational magnetic head device 3 is approached, the operating pin 55 exits the engaging slot portion 54b of the slide guide slot 54 to be then intruded into the second guide slot portion 54c to terminate the shifting of the reel block base plate 7 and the loading of the magnetic tape to cause transient cessation of the rotation of the drive motor 16. After the termination of the shifting of the reel block base plate 7, the operation of the drive motor 16 is controlled in such a manner that the operating pin 55 is turned clockwise or counterclockwise within the second guide slot portion 54c of the slide guide slot 54, as later described. The operating pin 57 then causing the operating lever 32 to be turned to shift the operating mode changeover lever 31 to select various operating modes.

When the motor 16 is driven into rotation so that the cassette holder 10 is lowered towards the reel block base plate 7 and the base plate 7 is shifted towards the magnetic head device 3, the loading unit for the magnetic tape 2 is actuated into rotation by the shifting of the base plate 7, so that the magnetic tape 2 is pulled out of the tape cassette 4 mounted to the reel blocks 5, 6 and placed into the predetermined tape route.

Figure 6:
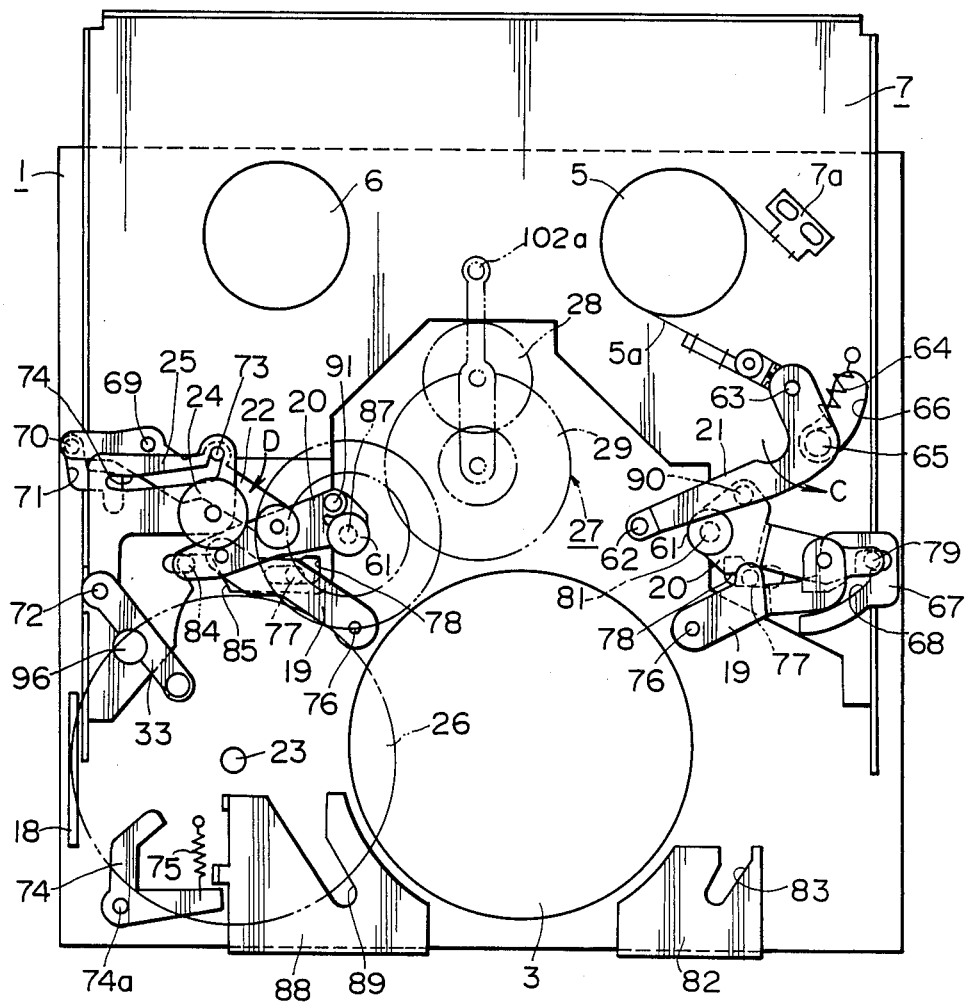
FIG. 6 is a plan view showing the magnetic tape loading system, and especially showing the unloading state of the magnetic tape.

Thus, with the reel block base plate 7 at the pulled out position, the tape loading arms 20, 20, tension control arm 21, tape guide arm 22 and the pinch roller supporting arm 25, that make up the loading unit, are at the receded position shown in FIG. 6 in which they are turned towards the reel blocks 6, 7. The tape guide rollers 61 provided at the ends of the tape guide arm 22 and the tape loading arms 20, 20, the tape guide pin 62 at the end of the tension control arm 21 and the pinch roller 24, are positioned in a recess provided for receiving the loading unit on the front side of the tape cassette 2 so as to face to the back side of the magnetic tape 2 extended on the front side of the tape cassette 4.

When the reel block base plate 7 starts to be moved towards the magnetic head device 3, the tension regulating or control arm 21, which is rotatably supported on the reel block base plate 7 through the supporting shaft 63 and which is biased by a tension spring 64 having its one end retained by the chassis base plate 1, has its central guide pin 65 guided within an arcuate guide slot 66 bored in the reel block base plate 7 and is turned significantly counterclockwise or in the direction of the arrow C in FIG. 6, with the supporting shaft 63 its as center of rotation, under the bias of the tension spring 64, so that its foremost part provided with the upright tape guide pin 62 is intruded into the guide slot 68 of the slide guide block 67 provided to one side of the reel block base plate 7. When the tension control arm 21 is turned in this manner, a brake band 5a wound on the supply base block 5 and having one end secured to the base portion of the arm 21 and the other end secured to a stationary block 7a of the reel block base plate 7 is wrapped strongly about the supply reel 5 so that a predetermined load is applied to the supply reel block 5 in dependence upon the variable rotational position of the tension control arm 21.

The tape guide arm 22 rotatably supported on the reel block base plate 7 through the supporting shaft 69 has a rotation guide pin 70 projectingly formed at the proximate end thereof guided in a crank-shaped guide slot 71 bored in the chassis base plate 1, in such manner that the arm 22 is turned clockwise in the direction of the arrow D in FIG. 6 with the supporting shaft 69 as its center of rotation. With such turning of the tape guide arm 22, the pinch roller supporting arm 25, rotatably supported on the reel block base plate 7 through the medium of a supporting shaft 72 and having a guide pin 73 implanted halfway on one side of the tape guide arm 22 engaged with a rotation guide slot 74 is turned to a position in which the end pinch roller 24 is proximate to the capstan 23. When he pinch roller supporting arm 25 is turned, the pinch roller support arm control arm 33 having the supporting shaft 72 in common with the pinch roller supporting arm 25 and turned in interlocked relation with the supporting arm 25, is turned clockwise with the supporting shaft 72 as its center of rotation. The pinch roller support arm control arm 33 has its foremost part abutted on one end of a pinch roller support arm thrusting lever 74 which is rotatably supported on the chassis base plate 1 through the supporting shaft 74a and which has its one end biased by a spring 75 so as to be turned towards the control arm 33, in such a manner that the spring force of the spring 75 acts on the control arm 33 to cause the pinch roller supporting arm 25 to be biased to be turned towards the capstan 23.

The chevron-shaped arms 19, 19 rotatably supported on the chassis base plate 1 through supporting shafts 76, 76 and having rotation guide pins 77, 77 implanted halfway on one side engaging in guide slots 78, 78 formed as elongated through-holes in the reel block base plate 7, are turned towards the magnetic head device 3. The one of the tape loading arms 20, 20 having the proximate sides pivotally mounted halfway to the foremost part of these chevron-shaped arms 19, 19 that is located towards the supply reel block 5, is turned to follow up with the rotation of the bent arm 19, with the slide guide pin 79 implanted on the proximate side being guided in a guide slot 68 of the slide guide block 67. As the aforementioned one tape loading arm 20 is about to exit the guide slot 68 of the slide guide block 67, the tape loading arm supporting pin 81 coaxially depending with the tape guide roller 61 implanted on the foremost part of the loading arm 20 is engaged in a supporting guide slot 83 of a supporting block 82 provided to one side of the magnetic head device 3, so that the loading arm 20 is turned with the tape loading arm supporting pin 81 being guided in the supporting guide slot 83 until the supporting pin 81 abuts on the position regulating section at the innermost portion of the support guide slot 83. The other tape loading arm 20 is turned to follow up with rotation of the bent arm 19, with the slide guide pin 84 implanted on the proximate end thereof being guided in an inclined guide slot 85 bored at the foremost end of the reel block base plate. As the slide guide pin 84 is about to exit the inclined guide slot 85, a tape loading arm supporting pin 87 coaxially and dependingly formed from the tape guide roller 61 implanted at the foremost part of the aforementioned other tape loading arm 20 is engaged with a supporting guide slot 89 of the supporting block 88 provided to the other side of the magnetic head device 3. The loading arm 20 continues to be turned with the aforementioned tape loading arm supporting pin 87 being guided in the supporting guide slot 89 until the supporting pin 87 abuts on the position regulating section in the innermost portion of the supporting guide slot 89.

On the foremost portions of the tape loading arms 20, 20, inclined guide pins 91, 91 are implanted in a side-by side relation with the tape guide rollers 61, 61.

Figure 7:
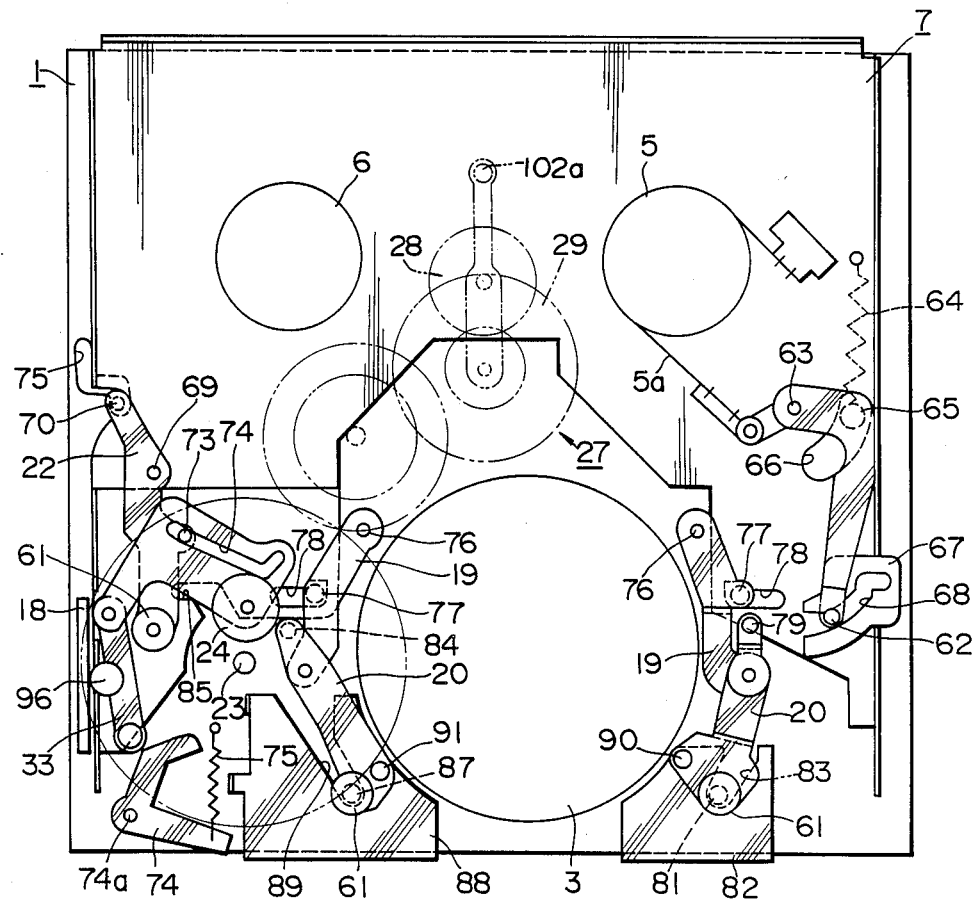
FIG. 7 is a plan view showing the magnetic tape loading system, and especially showing the loading state of the magnetic tape.

As described hereinabove, with the movement of the reel block base plate 7 towards the rotational magnetic head device 3, the tension control arm 20 and the tape guide arm 22 are turned significantly, while the chevron-shaped arms 19 and the tape loading arm 21 are turned, so that the magnetic tape 2 in the tape cassette 4 is pulled about the tape guide roller 61 and the tape guide pin 62 into the tape path or route shown in FIGS. 3 and 7, while it is wound and loaded obliquely on the rotational magnetic head device 3 over a predetermined angle.

The driving state of the reel block drive unit 27 may be selected by the changeover operation of the operating mode changeover lever 31 and by the shifting of the pinch roller 24 into and out of contact with the capstan 23 so that the magnetic tape 2 loaded as described above may be set to a constant speed running, rapid feed or rewind modes.

The operation of shifting the pinch roller 24 into or out of contact with the capstan 23 in a controlled manner may be obtained by the mode changeover auxiliary gear 18 pivotally mounted to the upright wall 14 on the other side of the chassis base plate 1 and rotated in synchronism with the drive gear 17 which is driven into rotation by the operation of the driving motor 16. This mode changeover auxiliary gear 18 is rotated in synchronism with the drive gear 17 by being connected through a first intermediate gear 94 and a second intermediate gear 95 to a drive power transmitting gear 93 connected through a coupling shaft 92 to the first intermediate gear 48 constituting a speed reducing gearing connecting the drive motor 16 and the drive gear 17 to each other as shown in FIG. 3. It is noted that the same gear ratio is used for the intermediate gears 48, 49, 50 associated with the drive gear 17 and for the motion transmitting gear 93 and the first and second intermediate gears 94, 95 associated with the mode changeover auxiliary gear 18 for assuring synchronous rotation between the drive gear 17 and the mode changeover auxiliary gear 18.

Figure 8:
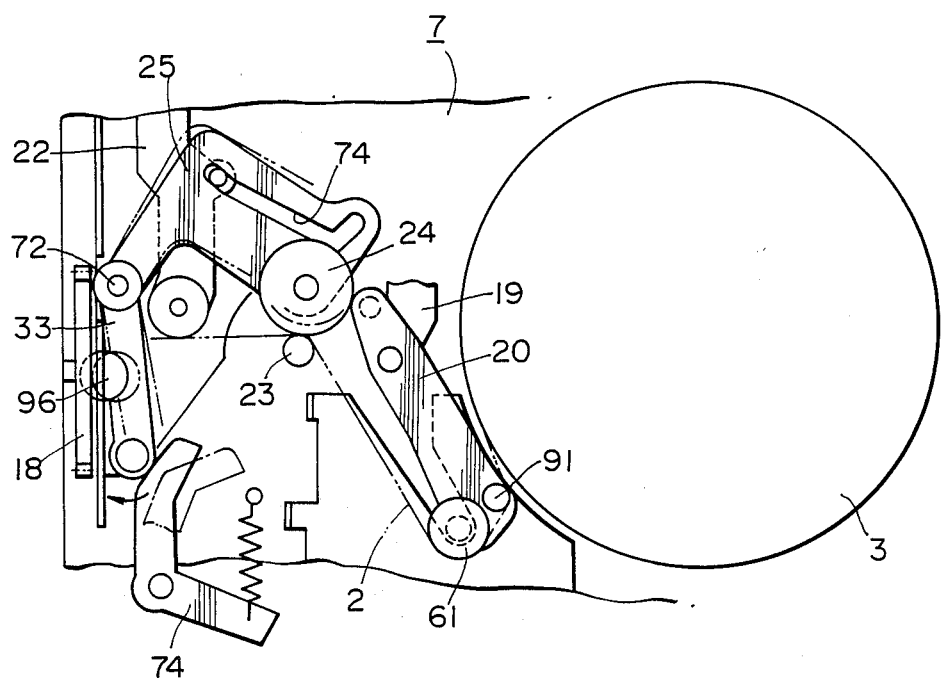
FIG. 8 is a perspective view showing essential parts of the control system for the shifting into and out of contact of the pinch roller.
Figure 9:
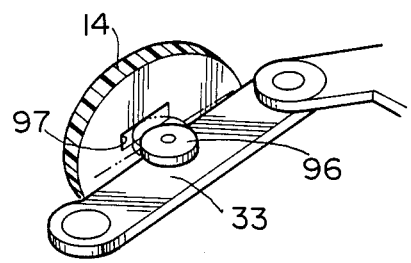
FIG. 9 is a perspective view showing a drive auxiliary gear portion.

On one major surface of the mode changeover auxiliary gear 18, there abuts a pressure roller 96 attached to one side at the midpoint halfway of the pinch roller supporting arm control arm 33 causing the pinch roller supporting arm 25 to be turned towards the capstan 23. On one major surface of the mode changeover auxiliary gear 18, there is formed a recess 97 for receiving the pressure roller 96, as shown in FIG. 9. After loading of the magnetic tape 2, the drive motor 16 is driven into rotation to turn the auxiliary gear 18 to cause the pressure roller 96 to be fitted into the recess 97. In this manner, the pinch roller supporting arm control arm 33 is turned by the pinch roller supporting arm thrusting lever 74 towards the mode changeover auxiliary gear 18 in the direction shown by the arrow E in FIG. 8, so that the pinch roller supporting arm 25 is turned towards the capstan 23 with the supporting shaft 72 it rotational as center to pressure the pinch roller 24 onto the capstan 24 to clamp and enable the magnetic tape 2 to run at a constant speed. As the mode changeover auxiliary gear 18 is turned to disengage the pressure roller 96 away from the recess 97, the control arm 33 is turned in a direction away from the mode changeover auxiliary gear 18, or in the direction opposite to that indicated by the arrow E in FIG. 8, against the biasing force of the pinch roller support arm thrusting lever 74. In this manner, the pinch roller supporting arm 25 is in turned in a direction away from the capstan 23 with the supporting shaft 72 as it rotational center to separate the pinch roller 24 away from the capstan 23 to permit selection of rapid feed, rewind or stop modes for the magnetic tape 2.

Figure 10:
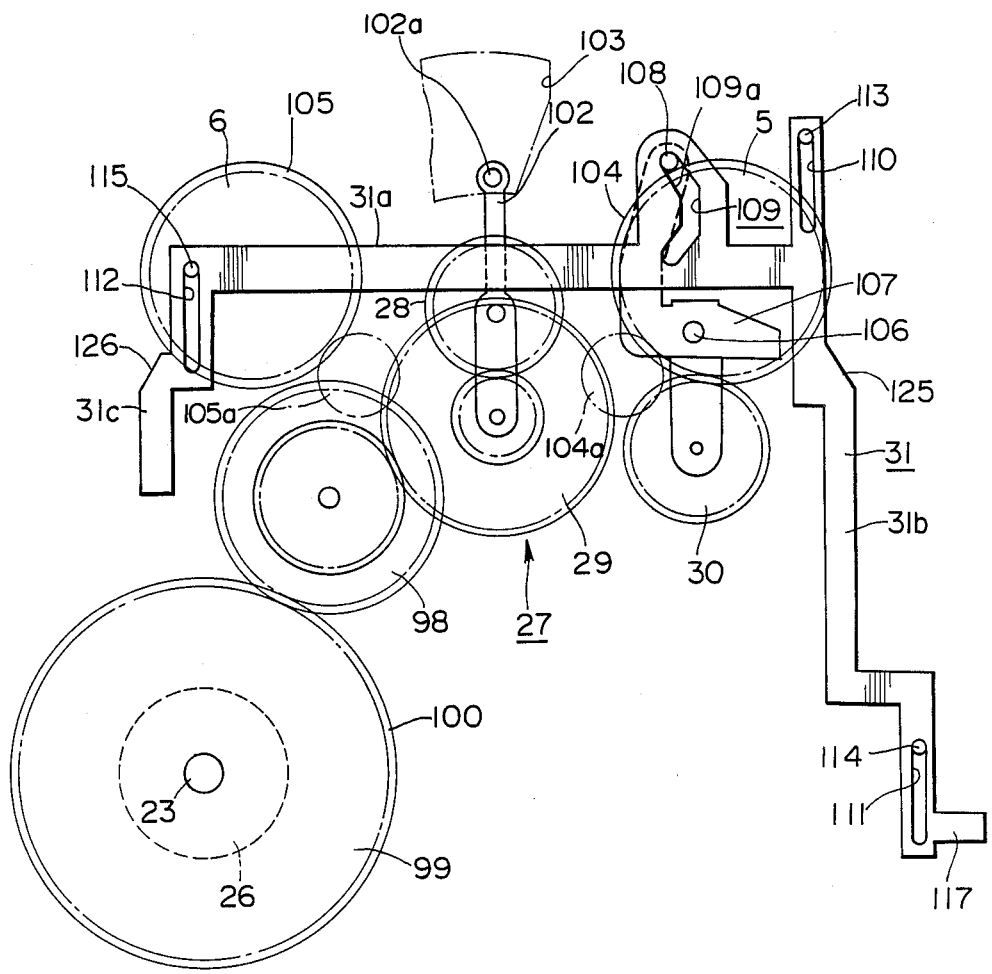
FIG. 10 is a plan view showing essential parts of the reel block drive system and the operating mode changeover lever and especially showing the stop operating mode.
Figure 11:
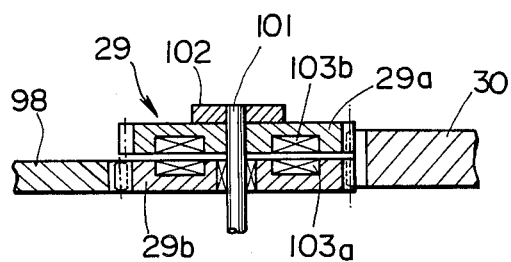
FIG. 11 is a longitudinal sectional view showing the motive power transmitting gear of the reel block drive system.

The reel block drive unit 27 is provided between the supply reel block 5 and the take-up reel block 6 for selectively driving these blocks 5 or 6 into rotation in dependence upon the tape running operating mode for the magnetic tape 2. As shown in FIG. 10, the drive unit 27 connects the drive power transmitting gear 29 through an intermediate gear 98 to a gearpart 100 formed on the outer perimeter of a flywheel 99 secured to the proximate side of the capstan 23, so that the drive unit is turned by the drive power developed by the capstan motor 26. The drive power transmitting gear 29 of the reel block drive unit 27 is designed as a double gear comprised of a first gear 29a and a second gear 29b stacked one upon the other and supported on a supporting shaft 101, as shown in FIG. 11, with the first gear 29a being secured to the shaft 101 and the second gear 29b being supported for free rotation on the shaft 101. On the confronting surface of these first and second gears 29a, 29b, permanent magnets 103a, 103b are provided so that the gears 29a, 29b are connected to and rotated in unison with each other under the force of attraction by these magnets. The second gear 29b rotatable with respect to the supporting shaft 101 meshes with the intermediate gear 98 which in turn meshes with the gear part 100 of the flywheel 99.

The reel block drive gear 28 is rotatably supported at the mid portion of a traverse arm 102 rotatably supported at the end of the supporting shaft 101, as shown in FIG. 10. The reel block drive gear 28 is connected to the drive power transmitting gear 29. The traverse arm 102 is turned about the supporting shaft 101 as its center of rotation, depending on the rotational direction of the capstan motor 26 which drives the motive power transmitting gear 29 into rotation to engage the reel block drive gear 28 supported at the end thereof with reel block drive auxiliary gears 104a, 105a of the reel block gears 104, 105 of the supply reel block 5 or the take-up reel block 6 for driving the reel blocks 5 or 6 into rotation.

A rotary guide pin 102a implanted at the distal end of the traverse arm 102 is engaged with a rotary guide opening 103 formed in the chassis base plate 1. The rotary guide pin 102a is guided by the rotary guide opening 103 when the traverse arm 102 performs a traverse motion in dependence upon the rotational direction of the capstan motor 26 to assure smooth rotation of the traverse arm 102. An excess pressure contact between the reel block drive gear 28 and the reel block drive unxiliary gears 104a or 105a is also controlled to assure that the pressure contact always occurs at a moderate pressure.

It is noted that, on one side of the drive power transmitting gear 29, there is provided the mode changeover gear 30 simultaneously meshing with the first and second gears 29a, 29b of the gear 29 and interconnecting these gears 29a, 29b to each other without resorting to the magnetic attraction of the magnets 103a, 103b to transmit the drive power of the capstan motor 26 directly to the reel block drive gear 28. This mode changeover gear 30 is rotatably supported at one end of a gear supporting arm 107 rotatably supported halfway by a supporting shaft 106 implanted on the chassis base plate 1. An engaging pin 108 is implanted on the other end of the gear supporting arm 107 so as to be engaged in a chevron-shaped cam groove 109 formed on the operating mode changeover lever 31 shifted by the driving rotation of the drive gear 17. The gear supporting arm 107 is turned by the shifting of the operating mode changeover lever 31 to change the engaging position of the engaging pin 108 in the cam groove 109 for shifting the mode changeover gear 30 into and out of contact with the motive power transmitting gear 29.

As shown in FIG. 10, the operating mode changeover lever 31 adapted to turn the gear supporting arm 107 to shift the mode changeover gear 30 into and out of contact with the motive power transmitting gear 29 is formed by a connecting arm 31 from both ends of which a first slide guide arm 31b and a second slide guide arm 31c are extended in the form of a letter U, and is disposed on the lower surface of the chassis base plate 1 with the connecting arm 31a extended between the supply reel block 5 and the take-up reel block 6 and with the first and the second slide guide arms 31b, 31c extended towards the rotary magnetic head device 3, as shown in FIG. 10. The changeover lever 31 is reciprocally mounted so as to approach to and recede away from the magnetic head device 3, with slide guide shafts 113, 114, 115 implanted on the chassis base plate 1 being introduced in and engaged with slide guide through-holes 110, 111, 112 formed in the first and the second slide guide arms 31b and 31c with the long axis of each of these through-holes lying in the longitudinal direction of these arms 31a, 31b.

It is noted that the operating mode changeover lever 31 is permanently biased towards the rotary magnetic head 3 by biasing means, such as springs, not shown.

Figure 12:
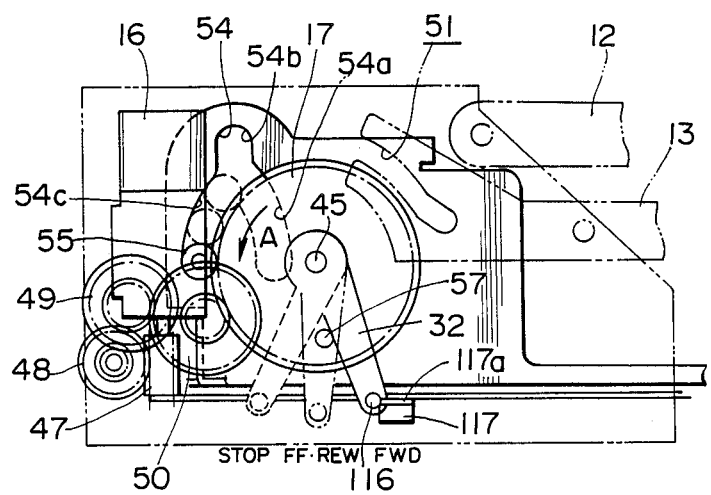
FIG. 12 is a side elevational view showing the state of selection of the operative mode initiated by the rotation of the drive gear.

The first slide guide arm 31b, extended from one end of the operating mode changeover lever 31, is extended to a position facing to the drive gear 16 provided on one side of the rotary magnetic head device 3. A thrusting operating member 117 is projectingly mounted one forward side of the slide guide arm 31b, as shown in FIG. 12, for confronting to an operating pin 116 projectingly mounted the end of the operating lever 32 supported by the supporting shaft 45 of the drive gear 17. The operating member 117 is formed with a bent forward abutment portion 117a abutting on the operating pin 116.

When the drive motor 16 is driven to cause the rotation of the drive gear 17 to thereby turn the operating lever 32, as shown in FIG. 12, the operating member 117 is thrusted by the operating pin 116 so that the operating mode changeover lever 31 is moved against or under the biasing force of the biasing means to change the engaging position of the engaging pin 108 at the proximate end of the gear supporting arm 107 with respect to the cam groove 109 to control the shifting of the mode changeover gear 30 into or out of contact with the reel block drive gear 28 to select the respective operating modes of the magnetic tape 2.

In the video tape recorder according to the present invention, when the magnetic tape 2 has been loaded onto the predetermined tape path or route and the operating mode is the stop mode in which the drive motor 16 is stopped while the capstan motor 26 is not driven yet, the operating pin 55 provided to the drive gear 17 is disposed at a position in which, as shown in FIG. 12, the operating pin 55 provided to the drive gear 17 is intruded into the second guide slot portion 54c of the slide guide slot 54 which is concentric with the trajectory of the operating pin 55. The drive gear 17 renders the base plate 7 in the inoperative state throughout the angular extent of the second guide slot portion 54c and is ready to be rotated further in the direction of the arrow mark A in FIG. 12. The operating pin 57 provided on the major surface of the drive gear 17 abuts on one lateral side of the operating lever 32 and the operating lever 32 is ready to be turned by the rotation of the drive gear 17 in the direction of the arrow A in FIG. 12. At this time, the operating pin 116 at the foremost part of the operating lever 32 abuts on the abutment portion 117a at the end of the thrusting operating member 117 of the operating mode changeover lever 31, such that the operating mode changeover lever 31 is ready to be shifted against the biasing force of the biasing means by the turning of the operating lever 31.

The operating mode changeover lever 31 has been shifted towards the rotary magnetic head device 3, under the biasing force of biasing means, as shown in FIG. 10, such that the engaging pin 108 at the other end of the gear supporting arm 107 is engaged in a first inclined cam groove portion 109a of a cam groove 109, the mode changeover gear 30 at the end of the gear supporting arm 107 being spaced apart from the motive power transmitting gear 29.

The mode changeover auxiliary gear 18, rotated in synchronism with the drive gear 17, is rotated to a position in which the recess 97 for receiving the pressure roller 96 attached to the pinch roller supporting arm control arm 25a is spaced apart a predetermined angle from the pressure roller 96, the pressure roller abutting on the major surface of the mode changeover auxiliary gear 18 and the pinch roller 24 being spaced apart from the capstan 23.

Figure 13:
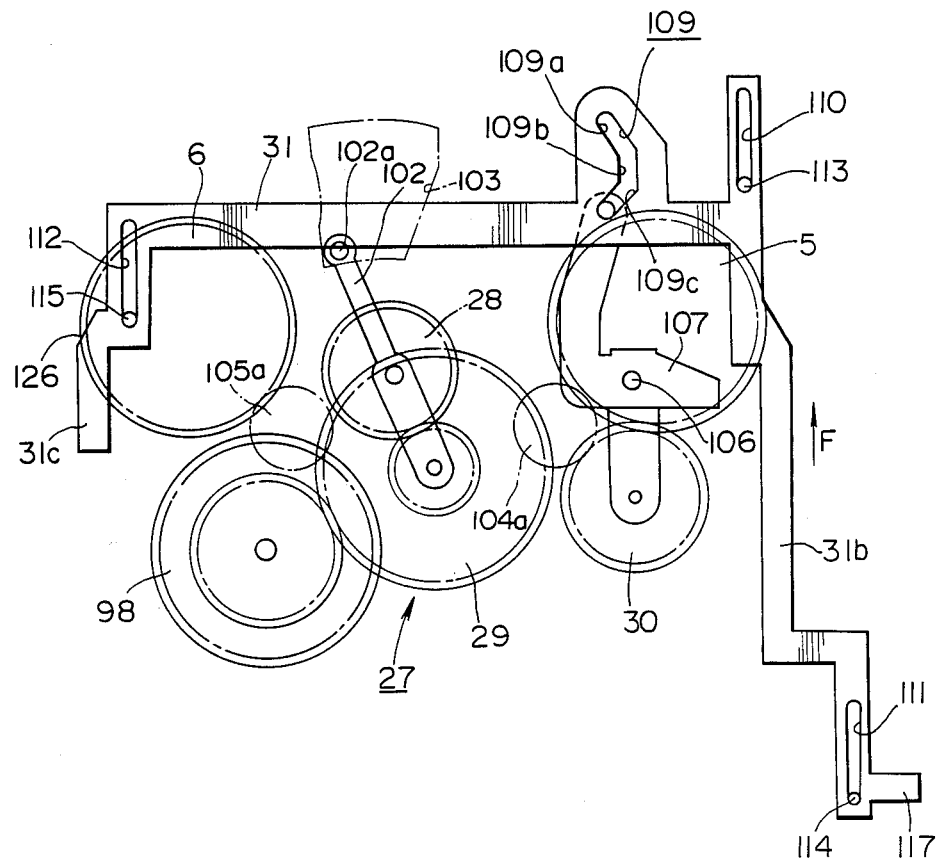
FIG. 13 is a plan view showing the constant speed running mode for the magnetic tape.

The drive motor 16 is further rotated from the stop mode state in which the leading of the magnetic tape 2 is completed and the driving of the drive motor 16 is transiently stopped, such that the drive gear 17 is turned in the direction shown by the arrow A in FIG. 12 and the operating mode changeover lever 31 is shifted by the operating lever 32 in the direction shown by the arrow F in FIG. 13, or in the direction away from the magnetic head device 3, against the biasing force of the biasing means, the engaging pin 108 at the other end of the gear supporting arm 107 intruding into the horizontal cam groove portion 109b of the cam groove 109 and being moved further into engagement with the second inclined cam groove portion 109c formed in continuation with the cam groove portion 109b. The mode changeover auxiliary gear 18, rotated in synchronism with the drive gear 17, is rotated at this time to a position in which the recess 97 registers with the pressure roller 96, so that the latter is fitted into the recess 97. The pinch roller supporting arm control arm 33 is turned by the pinch roller supporting arm thrusting lever 74 so that the pinch roller supporting arm 25 is turned towards the capstan 23, with the supporting shaft 72 as its center of rotation. The pinch roller 24 is pressured onto the capstan 24, as shown in FIG. 8, to clamp the magnetic tape 2 to set the constant speed running mode permitting constant speed running of the magnetic tape 2. The gear supporting arm 107 has the engaging pin 108 at the other end thereof engaged at this time with the second inclined cam groove portion 109c of the cam groove 109, so that the mode changeover gear 30 at the end of the gear supporting arm 107 is in a state in which it is spaced apart from the drive power transmitting gear 29 of the reel block driving unit 27. That is, the first and second gears 29a, 29b of the motive power transmitting gear 29 are coupled to each other only under the force of attraction of the magnets 103a, 103b.

When the capstan motor 26 is driven into rotation at this time, the capstan 23 is rotated to start the constant speed driving of the magnetic tape 2. As the capstan motor 26 is driven into rotation, the traverse arm 102 of the reel block drive unit 27 is turned towards the take-up reel block 6, the reel block drive gear 28 provided at mid portion of the traverse arm 102 meshing with the reel block drive auxiliary gear 105a which in turn meshes with the reel block gear 105 of the reel block 6 to cause the rotation of the reel block 6 to effect a take-up operation of the magnetic tape 2. At this time, since the first and the second gears 29a, 29b, of the motive power transmitting gear 29 are connected to each other only by the force of magnetic attraction of the magnets 103a, 103b, the speed with which the take-up reel block 6 is changed by, for example, the load applied to the take-up reel block 6.

Figure 14:
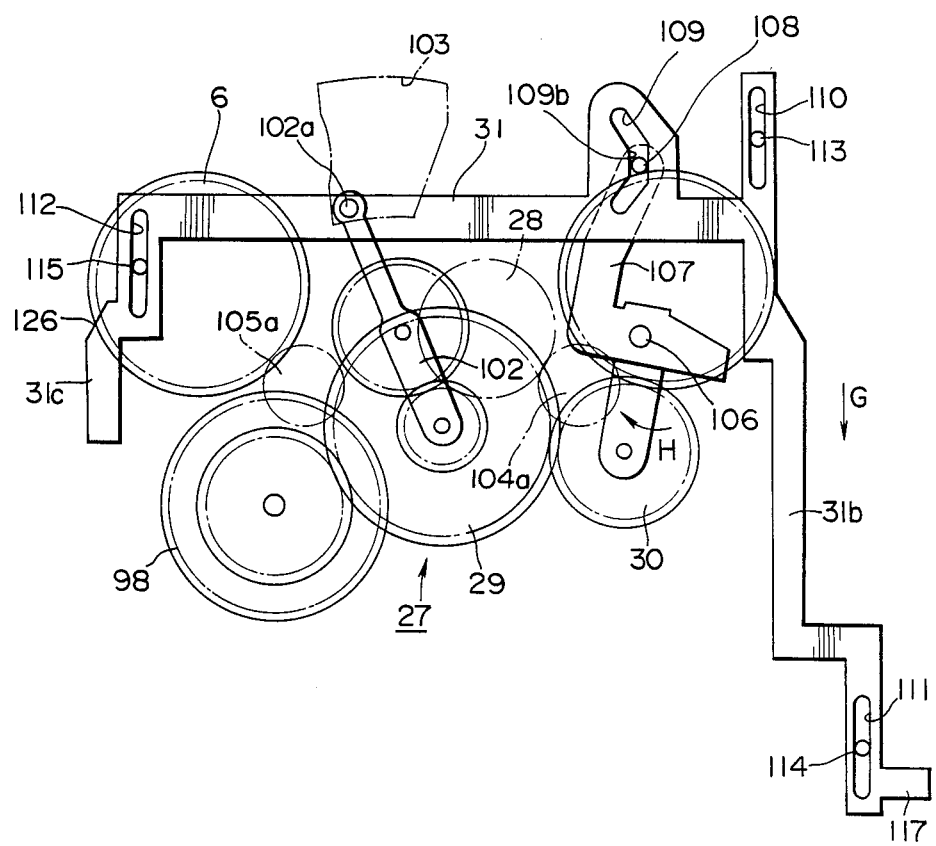
FIG. 14 is a plan view showing the rapid feed or rewind operating mode for the magnetic tape.

It is now assumed that the drive motor 16 is further driven into rotation from the aforementioned stop mode state, the drive gear 17 being turned in the direction of the arrow A in FIG. 12, the operating motor changeover lever 31 being shifted by the operating lever 32 in the direction shown by the arrow F in FIG. 13, or in a direction away from the rotary magnetic head device 3, against the biasing force of the biasing means, or that the drive motor 16 is driven in reverse so that the drive gear 17 is rotated from the constant speed mode for the magnetic tape 2 in the direction opposite to that shown by the arrow A in FIG. 12, the changeover lever 31 being shifted by the biasing force of the biasing means in the direction opposite to that indicated by the arrow G in FIG. 14, or in a direction towards the magnetic head device 3. At this time, the engaging pin 108 at the other end of the gear supporting arm 107 is intruded into the horizontal groove portion 109b of the cam groove 109, the gear supporting arm 107 being turned in the direction of the arrow H in FIG. 14 with the supporting shaft 109 as its center of rotation, the mode changeover gear 30 meshing with the drive power transmitting gear 29. By such meshing of the mode changeover gear 30, the first and the second gears 29a, 29b of the drive power transmitting gear 29 are coupled to each other by the drive power transmitting gear 29 without the intermediary of the magnetic attraction of the magnets 103a, 103b, the drive power of the capstan motor 26 being directly transmitted to the reel block drive gear 28 to permit rotation of the supply reel block 5 or the take-up reel block 6.

The mode changeover auxiliary gear 18, rotated at this time in synchronism with the drive gear 17, is turned at this time to a position in which the major surface of the mode changeover auxiliary gear 18 is pressured, with the recess 97 disengaging from the pressure roller 96. The pinch roller supporting arm control arm 25a is turned against the biasing force of the pinch roller supporting arm thrusting lever 74, the pinch roller supporting arm 25 being turned in a direction away from the capstan 23 with the supporting shaft 72 as its center of rotation, the pinch roller 24 being spaced away from the capstan 23 to permit the running of the magnetic tape 2 at a speed corresponding to the rotational speed of the reel blocks 5, 6.

When the drive motor 16 is stopped after the selection of the above described state, and the capstan motor 26 is driven into rotation, the rotary drive power of the capstan 26 is directly transmitted as described above to the reel block drive gear 28 to turn the traverse arm 102 in dependence upon the rotational direction of the capstan motor 26 to cause the reel block drive gear 28 to mesh with the auxiliary gear 104a of the reel block gear 104 of the supply reel block 5 or with the reel block drive auxiliary gear 105a of the reel block gear 105 of the take-up reel block 6 to cause rotation of one of these reel blocks 5, 6 at a speed corresponding to the rotational speed of the capstan motor 26. The rapid feed operating mode and the take-up mode for the magnetic tape 2 are selected when the take-up reel block 6 on the supply reel block 5 are actuated into rotation, respectively.

The reel block base plate 7 is provided with a supply side brake lever 8 adapted for locking the supply reel block 5 against rotation when the reel block base plate 7 is shifted as described above, and a take-up brake lever 9 adapted for locking the take-up reel block 6 against rotation before and after the shifting of the reel block base plate 7 and for being spaced apart from the take-up reel block 6 during movement of the reel block base plate 7 to permit free rotation of the reel block 6, as shown in FIGS. 1 and 2. The supply side brake lever 8 and the take-up side brake lever 9 are rotatably supported through the supporting shafts 115, 116 implanted on the reel block base plate 7, respectively. As shown, these brake levers 8, 9 are provided at one end thereof with brake shoes 8a, 9a and are urged into rotation by tension spring 118, 119 in a direction in which the shoes are pressured onto the reel blocks 5, 6. Guide pins 120, 121 are suspendedly provided at the mid portions of the brake levers 8, 9.

The supply side brake lever 8 is mounted with the guide pin 120 introduced through an elongated opening 122 bored in the reel block base plate 7 with the long axis thereof lying in a direction orthogonal to the shifting direction of the reel block base plate 7. On the other hand, the take-up side brake lever 9 is mounted with the guide pin 121 introduced into an elongated opening 123 bored in the reel block base plate 7 with the long axis thereof lying in a direction orthogonal to the shifting direction of the reel block base plate 7 and into a brake lever control cam groove 124 formed in the chassis base plate 1 with a length corresponding to the distance the reel block base plate 7 is moved. The brake lever control cam groove 124 is comprised of a first inclined cam surface 124a and a second inclined cam surface 124b at both longitudinal ends inclined towards the take-up reel block 6 and a horizontal cam surface 124c between these inclined cam surfaces 124a, 124b.

Thus the supply side brake lever 8 having its guide pin 120 introduced into the elongated opening 122 may be biased into rotation without being rotated during the shifting of the reel block base plate 7 for pressuring the brake shoe 8a to the supply reel block 5 to lock the reel block 5 to control the rotation.

Figure 15:
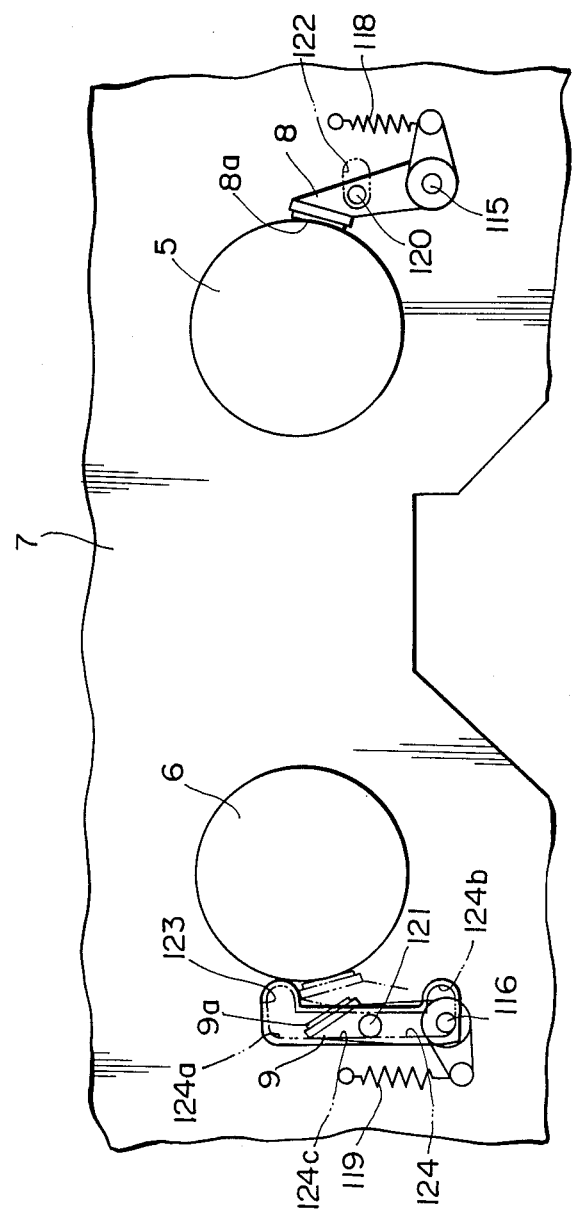
FIG. 15 is a plan view showing the brake system for the reel block.

On the other hand, the take-up side brake lever 9, having its guide pin 121 inserted into and engaged with both the elongated opening 123 in the reel block base plate 7 and the brake lever control cam groove 124 in the chassis base plate 1, is biased into rotation by the tension spring 119 when the reel block base plate 7 is at the pulled out position, so that the guide pin 120 is pressured onto the first inclined cam surface 124a of the brake lever control cam groove 124, so that the brake shoe 9a is pressured to the reel block 6 to lock it. When the reel block base plate 7 is shifted as shown in FIG. 15 relative to the rotary magnetic head device 3, the horizontal guide pin 121 rides on the horizontal cam surface 124c of the brake lever control cam groove 124, so that the take-up side brake lever 9 is turned in a direction away from the take-up reel block 6 against the urging force of the tension spring 119 to permit free rotation of the take-up reel block 6. When the reel block base plate 7 reaches the receded position close to the rotary magnetic head device 3, the guide pin 121 reaches the second inclined cam surface 124b of the brake lever control cam groove 124, so that the take-up brake lever 9 is turned under the biasing of the tension spring 119 in a direction to thrust the brake shoe 9a onto the take-up reel block 6 to lock the take-up reel block 6.

As described hereinabove, the supply and take-up side brake levers 8, 9 are turned in a controlled manner in operative association with the shifting operation of the reel block base plate 7, so that the rotation of the tape reel of the tape cassette 4 engaged with the supply reel block 5 is controlled to prevent unnecessary reeling out and slacking of the magnetic tape 2. Also, the take-up reel block 6 may be rotated during the loading operation, so that the unnecessary load may be prevented from being applied to the loaded magnetic tape 2.

It is noted that, after the reel block base plate 7 is shifted towards the rotary magnetic head device 3 and the loading operation of the magnetic tape 2 is completed, and when the operating mode changeover lever 31 is shifted by the rotation of the drive motor 17 for selecting one of the constant speed running, rapid feed and rewind modes, the brake levers 8, 9 are turned by the operating mode changeover lever 31 against the bias of the tension springs 118, 119 to separate the brake shoes 8a, 9a from the reel blocks 5, 6 and permit free rotation of these reel blocks. That is, when the operating lever 31 for the above operating modes is shifted, with the magnetic tape 2 being loaded, the one sides of the brake levers 8, 9 are thrusted by inclined thrusting operating surfaces 125, 126 formed halfway on the first and second slide guide arms 31b, 31c, so that the brake shoes 8a, 9a are turned in a direction away from the reel blocks 5, 6.

From the foregoing it is seen that the video tape recorder according to the present invention is so designed and arranged that a drive gear is driven into rotation by the drive motor to lower the cassette holder supported by the supporting arm to secure the tape cassette supported by the cassette holder to the reel block on the reel block base plate, which is then shifted towards the rotary head device after the tape cassette is secured, the magnetic tape in the tape cassette being loaded on the predetermined tape path in the course of the shifting of the reel block base plate, the drive gear being actuated into rotation by the actuation into rotation of the drive motor after loading of the magnetic tape to actuate the mode changeover lever to select the predetermined operating mode. In such manner, the operations of attachment of the tape cassette, loading of the magnetic tape and selecting the operating modes after the loading operation of the magnetic tape, may be performed by one and the same drive motor, so that it is possible to reduce the number of drive means and simplify the respective components while further reducing the size and the thickness of the apparatus.

We claim as out invention:

1. A magnetic recording and/or reproducing apparatus for a tape cassette having a pair of tape reels and a magnetic tape, comprising:

a chassis base plate;

a rotary magnetic head device;

a reel block base plate mounted on said chassis base plate so as to be horizontally reciprocable with respect to said rotary magnetic head device, said reel block base plate including a pair of rotatable reel blocks provided so as to be engageable with the pair of tape reels of the tape cassette;

a cassette holder;

supporting arm means for supporting said cassette holder on said chassis base plate so that said cassette holder is vertically movable with respect to said reel block base plate;

an operating mode changeover lever for selecting operating modes of the magnetic tape which is extractable out of the tape cassette and loadable onto a predetermined tape route, said operating modes including constant speed running, rapid feed and rewind modes;

a drive motor;

a drive gear driven into rotation by said drive motor, said drive gear being associated with said supporting arm means and said reel block base plate, and being provided so that when driven into rotation said drive gear causes vertical movement of said cassette holder and reciprocation of said reel block base plate; and an operating lever adapted to be turned by said drive gear and provided so as to be operatively associated with said operating mode changeover lever, said operating lever when turned causing actuation of said operating mode changeover lever to select one of said operating modes.

2. A magnetic recording and/or reproducing apparatus according to claim 1; and further comprising a pair of chevron-shaped arms rotatably supported on said chassis base plate and having rotation guide pins implanted on mid portions thereof so as to engage in guide openings formed in the reel block base plate, and a pair of tape loading arms pivotally mounted at forward ends of said chevron-shaped arms and having guide pins implanted at proximate side ends so as to be engageable in guide slots, said chevron-shaped arms and said tape loading arms being turnable so as to extend laterally of the rotary magnetic head device by said reel block base plate being shifted towards said rotary magnetic head device to pull the magnetic tape out of said tape cassette so as to be taken up in said rotary magnetic head device.

3. The magnetic recording and/or reproducing apparatus according to claim 2, wherein each said tape loading arm has a tape guide roller vertically implanted at a forward side thereof and an inclined guide pin inclined at a predetermined angle with respect to said tape guide roller; and further comprising supporting guide block means for supporting each said tape loading arm so that when said arms are pivoted they extend laterally of said rotary magnetic head device so as to control the rotary position thereof.

4. The magnetic recording and/or reproducing apparatus according to claim 1 wherein one of said pair of reel blocks is a supply reel block and the other of said reel blocks is a take-up reel block; and further comprising a supply side brake lever provided so as to lock said supply reel block when said reel block base plate is reciprocated with respect to said rotary magnetic head device, and a take-up side brake lever provided so as to lock said take-up reel block against rotation before and after movement of said reel block base plate and so as to be spaced apart from said take-up reel block to permit free rotation thereof during movement of said reel block base plate.

5. The magnetic recording and/or reproducing apparatus according to claim 1, wherein said cassette holder has one side supported by a supporting arm and a rotation actuating arm each having one end pivotally mounted to said chassis base plate and its other side supported by a pair of supporting arms pivotally mounted at one end to said chassis base plate, said cassette holder being supported for movement vertically and parallel to said reel blocks mounted on said chassis base plate.

6. The magnetic recording and/or reproducing apparatus according to claim 5, wherein the tape cassette has a lockable front cover; and further comprising an unlocking member having an unlocking portion at a forward end thereof adapted for unlocking the front cover of the tape cassette, said unlocking member being rotatably supported by said rotation actuating arm supporting the one side of said cassette holder, said unlocking member being rotationally interlocked with said supporting arm means and rotation actuating supporting arm means by having a guide pin projectingly provided on said rotation actuating supporting arm means so as to engage in rotation guide slots formed halfway in said unlocking member, said unlocking portion being turnable so as to project at the bottom side of said cassette holder when said cassette holder has been turned to a raised position above said reel block base plate, said unlocking portion being turnable so as to clear said bottom side of said cassette holder when said cassette holder has been lowered towards said reel block base plate.

7. The magnetic recording and/or reproducing apparatus according to claim 5; and further comprising a cassette holder shift actuating pin and a reel block base plate shift actuating pin provided projectingly to said drive gear in a direction orthogonal to the major surface of said drive gear, said cassette holder shift actuating pin being engaged in a vertically actuating arm supporting said cassette holder; and still further comprising a slide guide wall provided upright to one side of said reel block base plate, said slide guide wall having a reel block base plate slide guide slot formed therein into which said reel block base plate shift actuating pin is engageable so that said drive gear is associated operatively with said rotation actuating arm and said reel block base plate.

8. The magnetic recording and/or reproducing apparatus according to claim 7, wherein said vertical movement actuating guide slot includes an engaging slot portion in which said cassette holder shift actuating pin is engageable from a time when the cassette holder is at an elevated position above said reel block base plate until a time when said cassette holder is at a lowered position in which it has been turned towards said reel block base plate, and a guide slot portion continuous with said engaging slot portion and concentric with the trajectory of rotation of said cassette holder shift actuating pin, and wherein said reel block base plate slide guide slot is formed by a first guide slot portion concentric with the trajectory of rotation of said reel block base plate shift actuating pin throughout an angular extent in which, when said reel block base plate is at a pulled-out position in which it is spaced apart from the rotary magnetic head device, said cassette holder shift actuating pin is engaged with said engaging slot portion of said vertical movement actuating guide slot by rotation of said drive gear so as to turn said rotation actuating arm to shift said cassette holder vertically, and further formed by an engaging slot portion in which said reel block base plate shift actuating pin is engaged during a time when said reel block base plate is moved from said pulled-out position to a receded position in which it is drawn close to said magnetic head device, and a second guide slot portion concentric with the trajectory of rotation of said reel block base plate shift actuating pin and formed so as to permit rotation of said drive gear only through a prescribed angle after said reel block base plate has reached said receded position.

9. The magnetic recording and/or reproducing apparatus according to claim 1; and further comprising,
gear means including a mode changeover auxiliary gear connected to a drive power transmitting gear connected through a connecting shaft to a speed reducing gearing connecting said drive motor and said drive gear, said auxiliary gear being rotated in synchronism with said drive gear, a pinch roller supporting arm having on an end thereof a pinch roller adapted to be moveable into and out of contact with a capstan shaft and rotatably mounted to said reel block base plate;

a rotation control arm for said pinch roller supporting arm, said control arm being supported by a supporting shaft in common with said pinch roller supporting arm and being turnable in an interlocked relation with said pinch roller supporting arm, a pinch roller supporting arm thrusting lever provided so to bias said rotation control arm so that said control arm is turnable in a direction in which said pinch roller is pressured onto said capstan shaft, and a thrusting roller provided at an intermediate portion of said rotation control arm and biased so as to be turnable by said thrusting lever, said thrusting roller being engageable in a mating recess formed on the major surface of said mode changeover auxiliary gear, said thrusting roller engaging in and disengaging from said mating recess by rotation of said mode changeover auxiliary gear for moving said pinch roller into and out of contact with said capstan shaft.

10. The magnetic recording and/or reproducing apparatus according to claim 1; and further comprising motive power transmitting gear means including a first gear fixedly mounted to a supporting shaft and a second gear rotatably supported with respect to said supporting shaft and connected by magnetic attraction to said first gear, said second gear being connected through an intermediate gear to a geared portion of a capstan flywheel, a traverse arm carrying at a forward and thereof a reel block drive gear connected through an intermediate gear to said motive power transmitting gear means, said traverse arm being rotatably mounted on said supporting shaft and being rotatable in dependence upon the direction of capstan rotation so as to selectively engage said reel block drive gear with a reel block gear of one of said supply reel block and said take-up reel block.

11. The magnetic recording and/or reproducing apparatus according to claim 10; and further comprising a gear supporting arm rotatably supported on said chassis base plate, and an operating mode changeover gear mounted on said gear supporting arm, said changeover gear being provided so as to simultaneously mesh with said first and second gears of said motive power transmitting gear means on actuation of said gear supporting arm into rotation.

12. The magnetic recording and/or reproducing apparatus according to claim 11; and further comprising an operating mode changeover lever mounted to said chassis base plate reciprocably relative to said rotary magnetic head device and having cam means formed thereon, and an engaging pin implanted on the proximate side of said gear supporting arm to which said operating mode changeover gear is mounted, said pin engaging with said cam means, said gear supporting arm being turnable by reciprocating movement of said operating mode changeover lever so as to selectively engage said operating mode changeover gear with said motive power transmitting gear.

13. The magnetic recording and/or reproducing apparatus according to claim 12; and further comprising a slide guide arm provided at one end of said operating mode changeover lever so as to extend to a position facing to said drive gear, said slide guide arm carrying at its forward end a thrusting operating piece engageable with an operative lever supported by the supporting shaft of said drive gear.

14. The magnetic recording and reproducing apparatus according to claim 13; and further comprising an operating pin provided on said drive gear so as to turn said operating lever upon rotation actuation of said drive gear after the reel block base plate shift actuating pin provided to said drive gear is in the portion of said reel block base plate slide guide slot concentric with the trajectory of shifting of said operating pin and is brought to an inoperative state, for reciprocating said slide guide arm.

* * * * *

UNITED STATES PATENT AND TRADEMARK OFFICE
CERTIFICATE OF CORRECTION

PATENT NO. : 4,853,804
DATED : August 1, 1989
INVENTOR(S) : Hisashi Suwa, et. al.

It is certified that error appears in the above-identified patent and that said Letters Patent is hereby corrected as shown below:

Col. 1, line 6, change "2" to --1.-- line 37, change "the" first occurence to --of--

Col. 2, line 33, change "the" --a--

Col. 6, line 4, after "of" insert --the--

Col. 7, line 37, change "the" to --its--

Col. 8, line 19, change "outward" to --outwards--

Col. 9, line 25, change "its as" to --as its-- line 53, change "he" to --the--

Col. 11, line 19, delete "halfway"

line 33, change "it rotational as" to --as its rotational-- line 34, change "24" to --23-- line 43, delete "in"

line 45, change "it" to --its-- line 55, change "gearpart" to --gear part--

Col. 13, line 13, after "mounted" insert --to-- line 15, delete "to"

line 16, after "mounted" insert --to--

UNITED STATES PATENT AND TRADEMARK OFFICE
CERTIFICATE OF CORRECTION

PATENT NO. : 4,853,804

DATED : August 1, 1989

INVENTOR(S) : Hisashi Suwa, et. al.

It is certified that error appears in the above-identified patent and that said Letters Patent is hereby corrected as shown below:

line   , after "54c" insert --,-- line 46, delete "mark"

Col. 14, line 59, after "29b" delete ","

Col. 17, line 41, change "out" to --our--

In Claims:

Col. 19, line 19, change "vertically" to --vertical--

Signed and Sealed this

Seventh Day of August, 1990

Attest:

HARRY F. MANBECK, JR.

*Attesting Officer*      *Commissioner of Patents and Trademarks*